INVENTORS:
KARL-HEINZ HERMANN, HERMANN SCHNELL, RUDOLF SCHNEIDER, GEORG SPOTT.

United States Patent Office 3,447,583
Patented June 3, 1969

3,447,583
PROCESS FOR THE CONTINUOUS REMOVAL OF MONOMERIC AND OLIGOMERIC FRACTIONS FROM NITROGEN CONTAINING POLYMERS
Karl-Heinz Hermann, Krefeld-Bockum, Hermann Schnell, Krefeld-Urdingen, Rudolf Schneider, Krefeld-Bockum, and Georg Spott, Krefeld-Urdingen, Germany, assignors to Farbenfabriken Bayer Aktiengesellschaft, Leverkusen, Germany, a corporation of Germany
Filed May 18, 1966, Ser. No. 551,079
Claims priority, application Germany, May 21, 1965, F 46,115
Int. Cl. B01d 1/22
U.S. Cl. 159—49                                4 Claims

ABSTRACT OF THE DISCLOSURE

A process for the continuous removal of the monomeric and oligomeric fractions contained in high molecular weight nitrogen-containing polymers in which a polymer melt is subjected to vacuum distillation in an apparatus comprising a tube and a rotating heated strip worm whereby the polymer melt is moved along the tube wall while leaving the internal volume of the tube free, the vacuum distillation being conducted at a temperature of 220° to 320° C., the pressure being in the range of 0.1 to 2 mm. Hg, the pitch of said strip worm being from about 20 to 200 mm. and being rotated at the rate of 2 to 150 r.p.m.

THE DISCLOSURE

Figure 1:
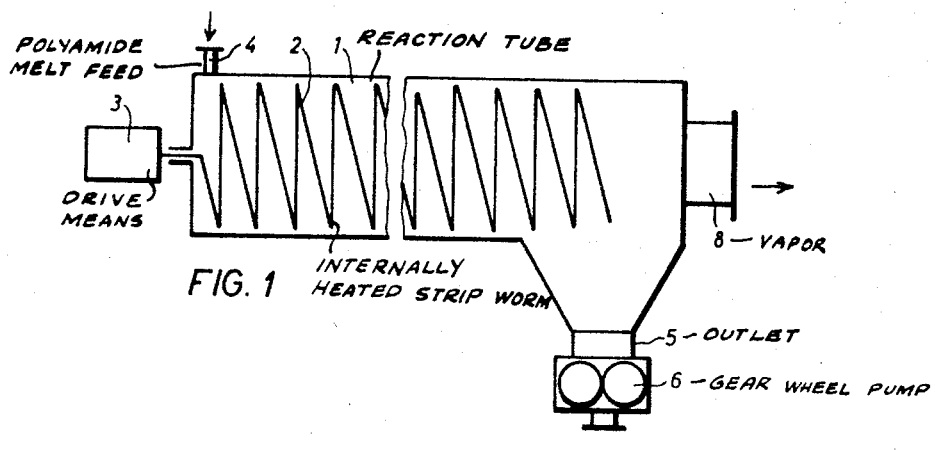

The present invention relates to an improved process for the continuous removal of the monomeric and oligomeric fractions from molten nitrogen-containing polycondensation or polymerisation products by vacuum distillation.

In the polymerisation of ε-caprolactam to form a polyamide of high molecular weight, it is known that a product is formed which also contains considerable quantities of monomeric and oligomeric fractions. Most of the possible industrial uses of polycaprolactam require that these fractions of low molecular weight should be substantially removed.

In the main, the following processes are known for this purpose: (a) Extraction of the monomeric and oligomeric fractions from polycaprolactam shreds with water. This process certainly enables the content of low molecular weight constituents to be reduced to below 1%, but it requires as additional costly working steps the drying of the polycaprolactam shreds after the extraction and the working up by distillation of the aqueous solution of monomeric and oligomeric caprolactam which is formed during the extraction. (b) Removal of the low molecular weight fractions from molten polycaprolactam by distillation, using an inert carrier gas, such as $N_2$ or steam. This process requires large quantities of a completely oxygen-free inert gas, the condensation of the distillate is difficult on account of vapour formation and the gas bubbles remaining in the melt must be removed by a subsequent vacuum treatment. (c) Removal of the low molecular weight fractions from molten polycaprolactam by vacuum distillation.

The apparatus so far proposed for carrying out this process necessitates comparatively long residence times, which results in an often undesirable rise in the molecular weight due to post-condensation, and in addition the removal of the low molceular weight fractions is only incomplete.

We have now found an improved process for continuously removing the monomeric and oligomeric fractions from molten nitrogenous polycondensation or polymerisation products of high molecular weight by vacuum distillation, in which process the monomer-containing and oligomer-containing melt of the nitrogenous polycondensation or polymerisation products is supplied to the inlet of a heated tube of conventional type under reduced pressure and is moved by an optionally heated strip worm (helix) along the inner wall of the tube towards the outlet, where the finished product free from monomer and oligomer is removed and the charging of the tube is effected in such a way that the inner part of the internal volume of the tube remains free, and the volatile monomeric and oligomeric fractions are discharged from the latter part of the internal volume.

Depending upon the particular requirements, the reaction tube can be brought to different temperatures at different positions. It is frequently advantageous to permit the temperature to rise from the inlet end to the outlet end. The tube can be set up vertically, horizontally or at an inclination.

With the new process, the heat necessary for vaporising the volatile monomeric and oligomeric fractions is transferred gently and uniformly to the polyamide melt without causing any overheating. The strip worm provides for a uniform transport of the polyamide melt through the tube. Due to the internal volume of the tube which is under reduced pressure being kept free and due to the constant thorough mixing of the polyamide melt, which travels in a more or less thin layer along the internal wall of the tube from the inlet end to the outlet end, a comparatively large and constantly renewed phase boundary is produced between the liquid polyamide and the gas or vapour space in the inner part of the tube, whereby the volatile monomeric and oligomeric fractions of the polyamide melt are extracted extremely quickly.

The coaction of all these advantages makes it possible for the high molecular weight nitrogenous polycondensation or polymerisation products, for example polycaprolactam, to be freed continuously from low molecular weight fractions down to a residual content of 1.0% to 1.5% in a surprisingly quick manner and with a residence time of from about 2 minutes to about 20 minutes. The process is suitable for comparatively thinly liquid polyamide melts, e.g. with a relative viscosity of 2.5 (measured in connection with a 1% solution in m-cresol), and also for highly viscous melts, for example with a relative viscosity of 4.0. By variation of the residence time, it is possible both to avoid an increase in molecular weight due to post-condensation and to achieve a controlled post-condensation.

The process is preferably carried out under a vacuum of 0.001 mm. to 10 mm. of Hg, advantageously of from 0.1 mm. to 2 mm. of Hg, and at a temperature which is between 220° C. and 320° C. and advantageously of from 250° C. to 290° C.

The internal diameter and the length of the tube, the pitch of the strip worm, its speed thereof, the charging of the apparatus, the progress of the vacuum distillation and the properties of the polyamide must be appropriate to one another. The most favourable conditions can easily be established by simple tests. Generally speaking, good results are obtained with a pitch of the strip worm from about 20 mm. to about 200 mm. and at speeds of from 2 r.p.m. to about 150 r.p.m. with a tube having, for example, an internal diameter of from 100 mm. to 200 mm. and a length of from 400 mm. to 2000 mm. with a charging rate of 1.0 kg./hour to 30.0 kg./hour. It is obvious that the apparatus is capable of being enlarged in any appropriate manner and adapted to the required throughput capacity.

As well as polycaprolactam, it is possible for polycondensation or polymerisation products to be subjected to the process, for example, polyamides, mixed polyamides, polyester amides and polyurea amides, which are composed wholly or in part of cyclic lactams or the corresponding aminocarboxylic acids, and which still show a relatively large content of volatile monomeric and oligomeric fractions after the polycondensation or polymerisation has been completed. Examples of cyclic lactams, which may optionally also be substituted, include: ε-caprolactam, 4-methyl-ε-caprolactam, 2-cyclohexyl-ε-caprolactam, oenanthalactam and capryllactam.

The process is suitable for products which have been prepared intermittently, e.g. in an autoclave, or even continuously, e.g. in a VK tube, by the usual polycondensation, using water or compounds splitting off water as a catalyst, or also by polymerisation under anhydrous conditions and using alkali metal catalysts, possibly in conjunction with polymerisation accelerators such as isocyanates.

The polyamide melt necessary for carrying out the process may be freshly taken from the polycondensation or polymerisation apparatus or may even be prepared from solidified material in the form of lumps, shreds, powder or fibres, by being melted in appropriate apparatus.

On account of the good mixing action of the apparatus used for carrying into effect the process according to the invention, the apparatus is excellently suitable for enabling the polyamide melt, simultaneously with the removal of the monomeric and oligomeric fractions, to be homogeneously mixed with additives, such as dyestuffs, pigments, fillers, stabilisers, plasticisers, mould-release agents and crystallisation initiators. The additives are preferably supplied in liquid form, possibly as a concentrate in the corresponding polyamide, the additives being fed by means of proportioning devices either into the tube which is under reduced pressure or to the polyamide melt before it enters the tube.

Figure 2:
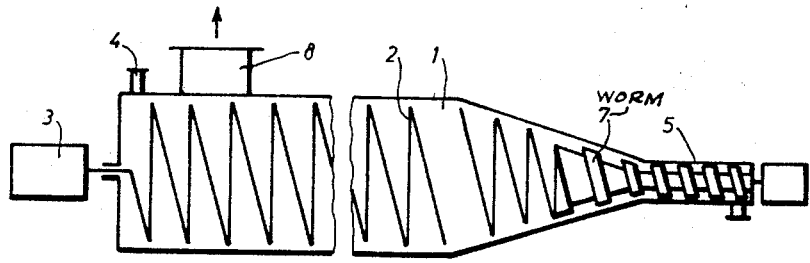

The accompanying FIGS. 1 and 2 show two modifications of an apparatus (a helical worm vaporiser) for carrying out the process. A reaction tube 1 is externally heated. A strip worm 2 disposed therein is set in rotation by a drive means 3 and takes over the transport of the polyamide melt introduced at the inlet end 4 up to the outlet end 5, the discharge being effected by a gear-wheel pump 6 or a worm 7, although it can also be effected by other known devices. The vapours are discharged through a pipe 8. The following examples illustrate more particularly the invention.

Example 1

A polycaprolactam melt at a temperature of 250° C. in which the content of monomeric and oligomeric fractions, measured by extraction with methanol, is 10.9%, and the relative viscosity of which, measured with a 1% solution in m-cresol at 25% C., after the extraction, is 2.52, is continuously introduced at the rate of 5 kg./hour by means of a gear-wheel pump into a tube which has an internal diameter of 100 mm. and a length of 600 mm., the tube being electrically heated to 260° C. and being under a vacuum of 0.2 of Hg. A strip worm running at a speed of 15 r.p.m. conveys the melt with a mean residence time of 5 to 8 minutes to the discharge end, where the melt is spun by means of an extruder in bristle form. The monomeric and oligomeric fractions which have been distilled off are collected in a cooled receiver. The final product has a residual content of monomeric and oligomeric fractions of 1.3% and a relative viscosity of 2.55.

Example 2

The same apparatus as in Example 1 is used. A polycaprolactam melt produced from shreds at a temperature of 260° C., the melt having a content of monomeric and oligomeric fraction of 10.1% and a relative viscosity, after the extraction, of 3.08 is continuously introduced at the rate of 4 kg./hour by means of a melt extruder into the tube, which is heated to 280° C. and is under a vacuum of 0.3 mm. of Hg. The strip worm has a speed of 9 r.p.m. and conveys the melt with an average residence time of about 20 minutes to the discharge end. The final product has a residual content of monomeric and oligomeric fractions of 1.25% and a relative viscosity of 3.97.

Example 3

Under the same conditions as in Example 1, a mixed polyamide of 85% by weight of caprolactam and 15% by weight of TH salt (salt of terephthalic acid and hexamethylene diamine), with a content of monomeric and oligomeric fractions of 9.5% and a relative viscosity, after the extraction, of 2.76, is introduced.

The final product has a residual content of monomeric and oligomeric fractions of 1.4% and a relative viscosity of 2.81.

Example 4

The procedure of Example 1 is used, except that in addition a polycaprolactam, containing 20% of $TiO_2$ as a concentrate, is continuously introduced by means of an extruder at the rate of 0.1 kg./hour. The final product has a residual content of monomeric and oligomeric fractions of 1.4% and a relative viscosity of 2.51, and contains 0.39% of $TiO_2$ distributed therein in a completely homogenous manner.

What we claim is:

1. A process for the continuous removal of monomeric and oligomeric fractions from high molecular weight nitrogen-containing polymers having a relative viscosity of 2.5 to 4 which comprises subjecting a melt of the polyamide to vacuum distillation in a heated tube having an internal diameter of 100 to 200 mm. and containing a rotating internally heated continuous strip worm extending substantially the length of said tube and separately recovering a polyamide from the walls of said tube and said monomeric and oligomeric fractions, said vacuum distillation being conducted at a temperature of 220° to 320° C. and at a pressure of 0.1 to 2 mm. Hg, said strip worm having a pitch of 20 to 200 mm. and being rotated at a rate, within the range of 2 to 150 r.p.m., sufficient to maintain a free inner space in said tube.

2. The process of claim 1 wherein the nitrogen-containing polymer is charged at a rate of 1 to 30 kg./hour for a residence time in said tube of 2 to 20 minutes.

3. The process of claim 1 wherein the nitrogen-containing polymer is a polyamide.

4. The process of claim 3 wherein the polyamide is polycaprolactam.

References Cited

UNITED STATES PATENTS

| | | | |
|---|---|---|---|
| 2,731,081 | 1/1956 | Mayner | 159—49 |
| 2,753,594 | 7/1956 | Buck | 18—8 |
| 3,242,969 | 3/1966 | Kiguchi | 159—6 |
| 3,252,502 | 5/1966 | Eckardt et al. | 159—6 |
| 3,266,555 | 8/1966 | Thier | 159—6 |
| 3,292,683 | 12/1966 | Buchi et al. | 159—6 |

NORMAN YUDKOFF, *Primary Examiner.*

J. SOFER, *Assistant Examiner.*

U.S. Cl. X.R.

159—6, 13; 260—78